July 8, 1958
W. G. REICHERT
2,841,840
AUTOMATIC APPARATUS FOR REMOVING CORE ARBORS FROM FOUNDRY FLASKS
Filed Aug. 13, 1954
7 Sheets-Sheet 1
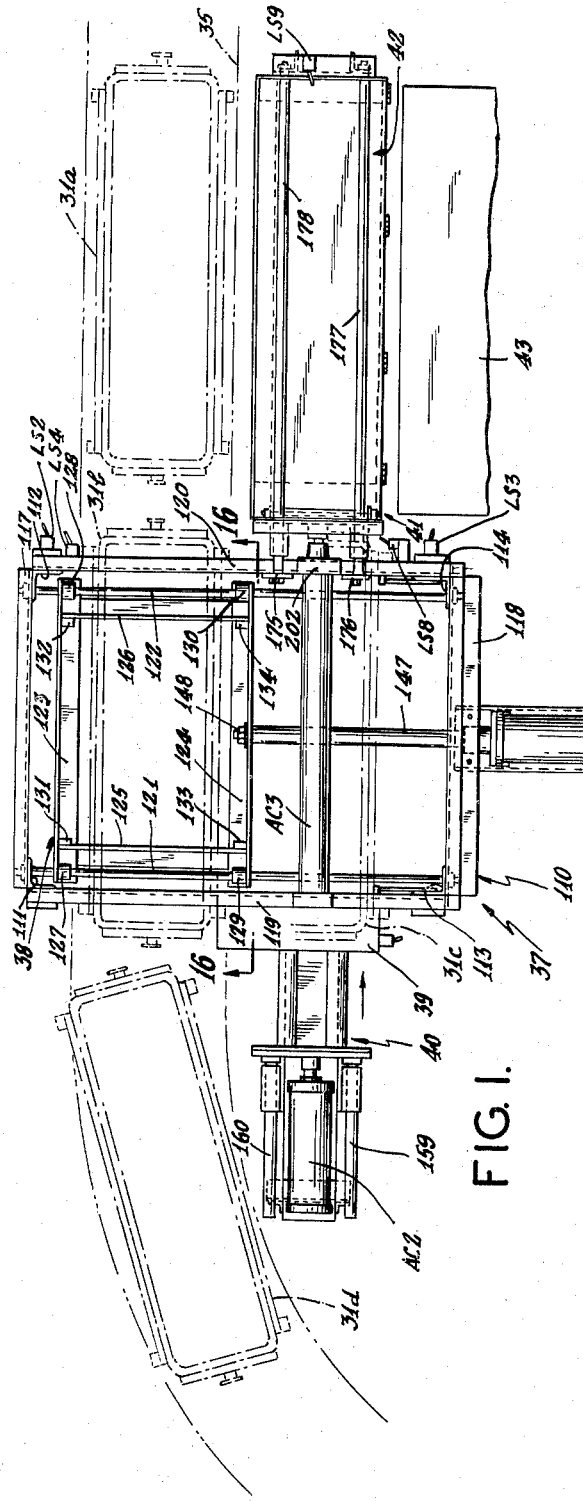
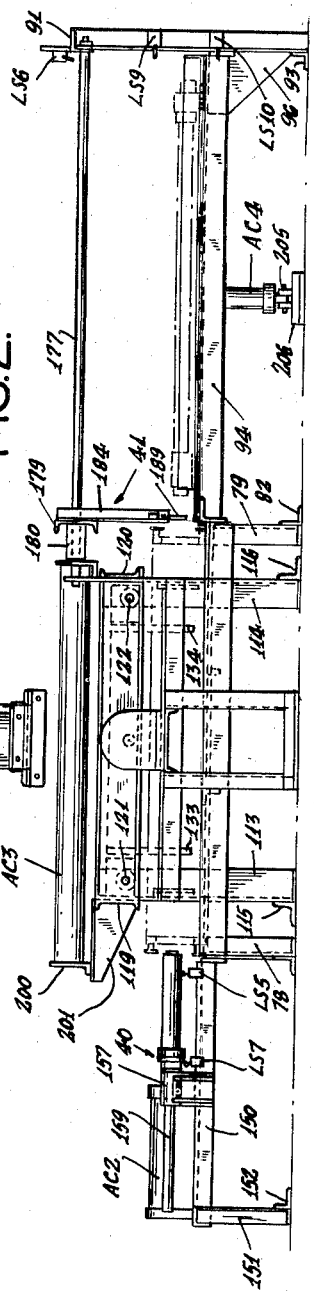
INVENTOR.
WILLIAM G. REICHERT
BY
*J. B. Felshin*
ATTORNEY.

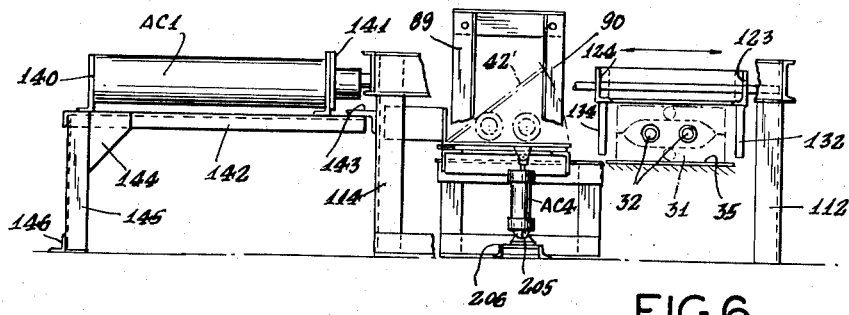
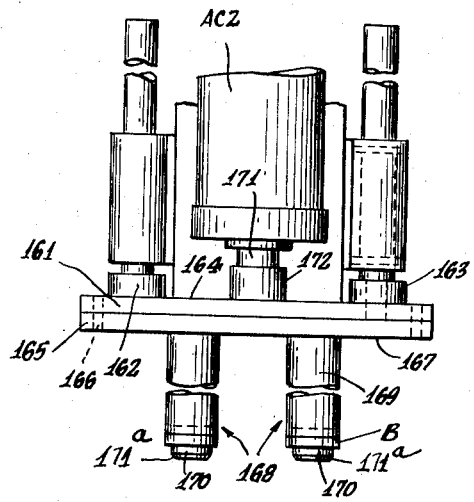
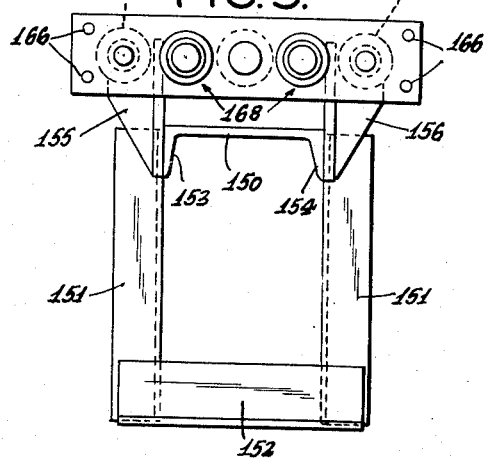
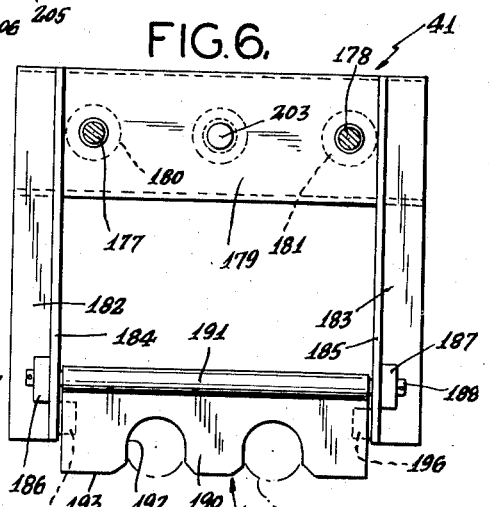
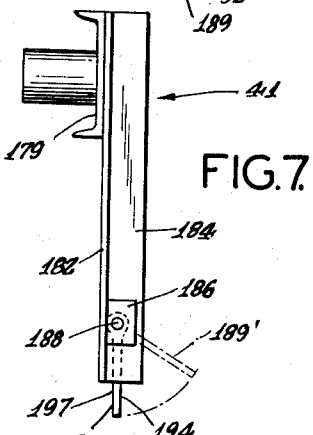

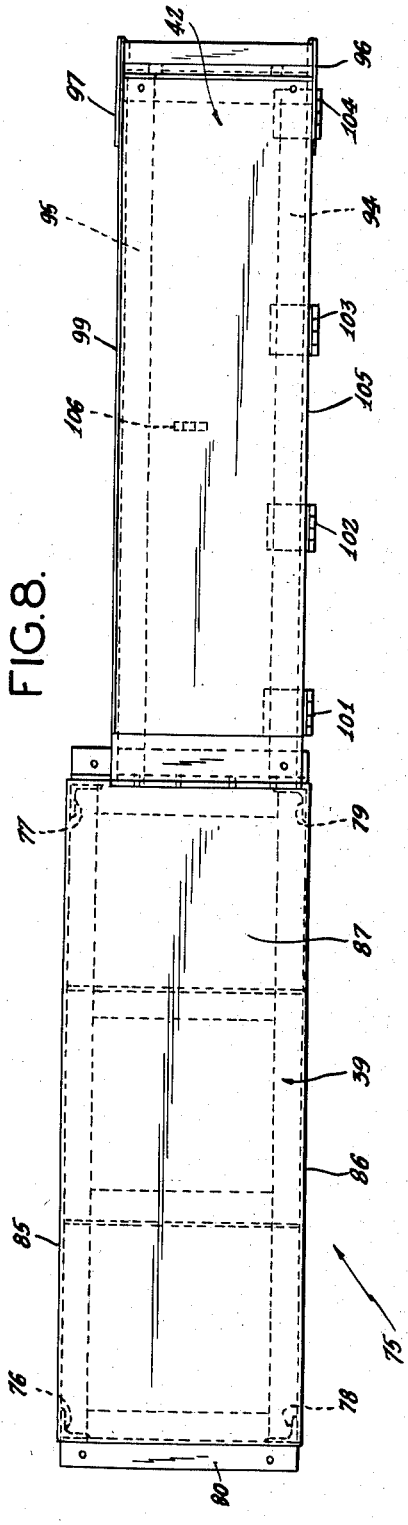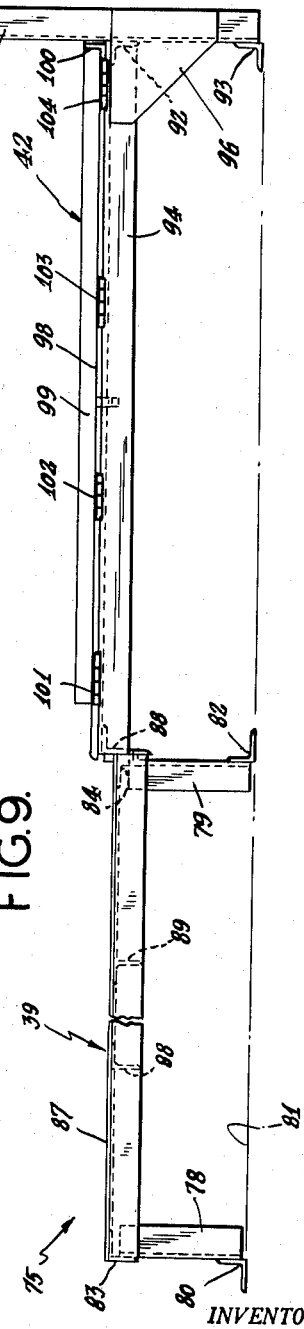

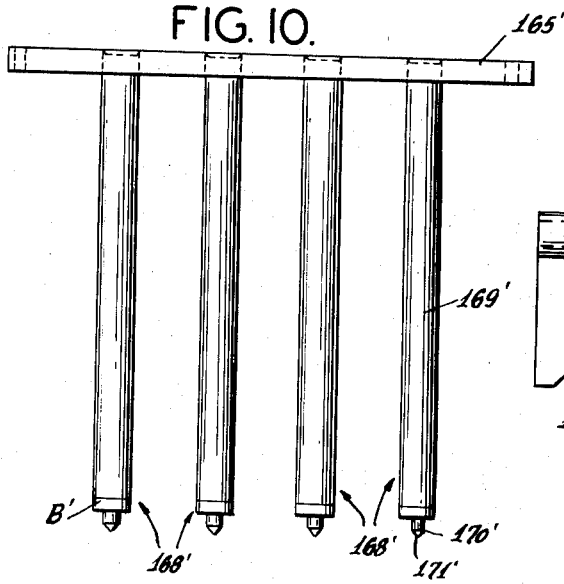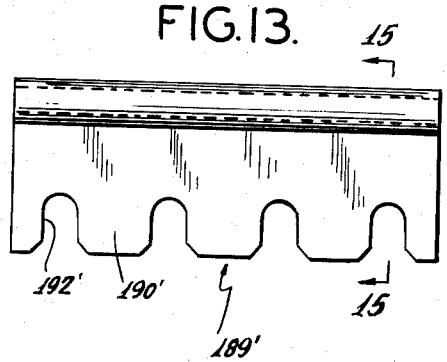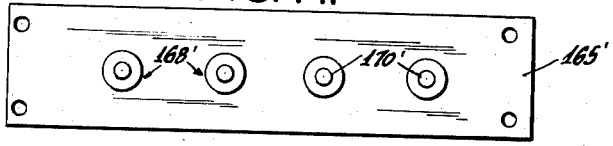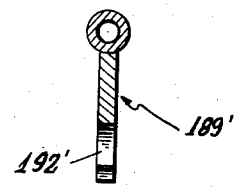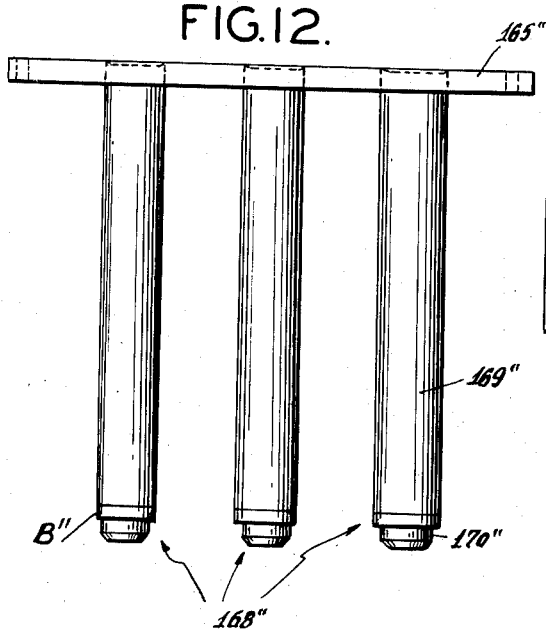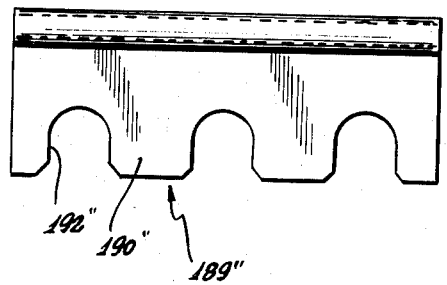

July 8, 1958  W. G. REICHERT  2,841,840
AUTOMATIC APPARATUS FOR REMOVING CORE ARBORS
FROM FOUNDRY FLASKS
Filed Aug. 13, 1954  7 Sheets-Sheet 5
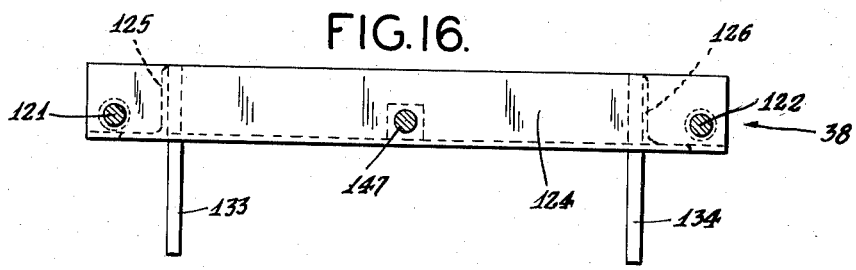
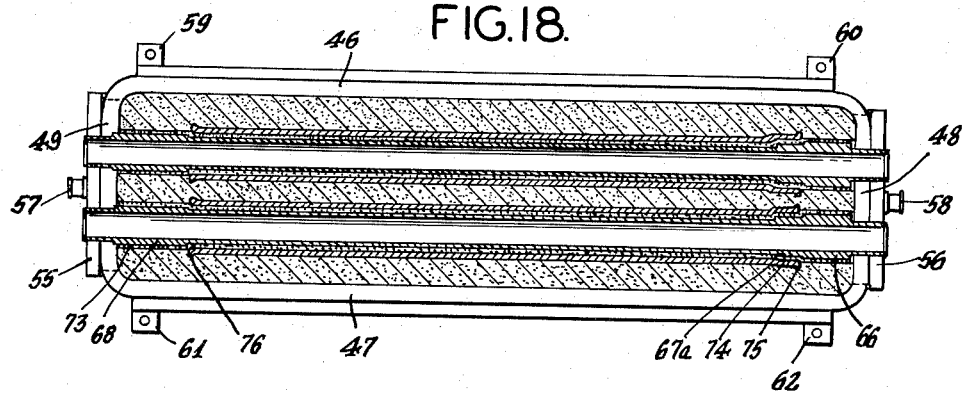
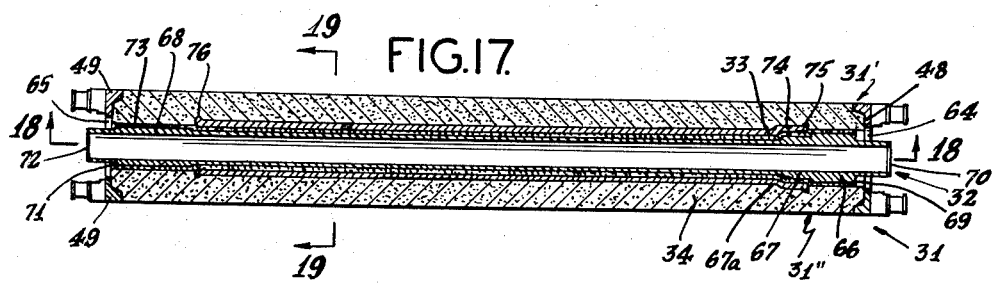
INVENTOR.
WILLIAM G. REICHERT
BY
ATTORNEY

CENTER LINE OF
ARBOR PUNCH OUT

INVENTOR.
WILLIAM G. REICHERT
BY
J. B. Felshin
ATTORNEY.

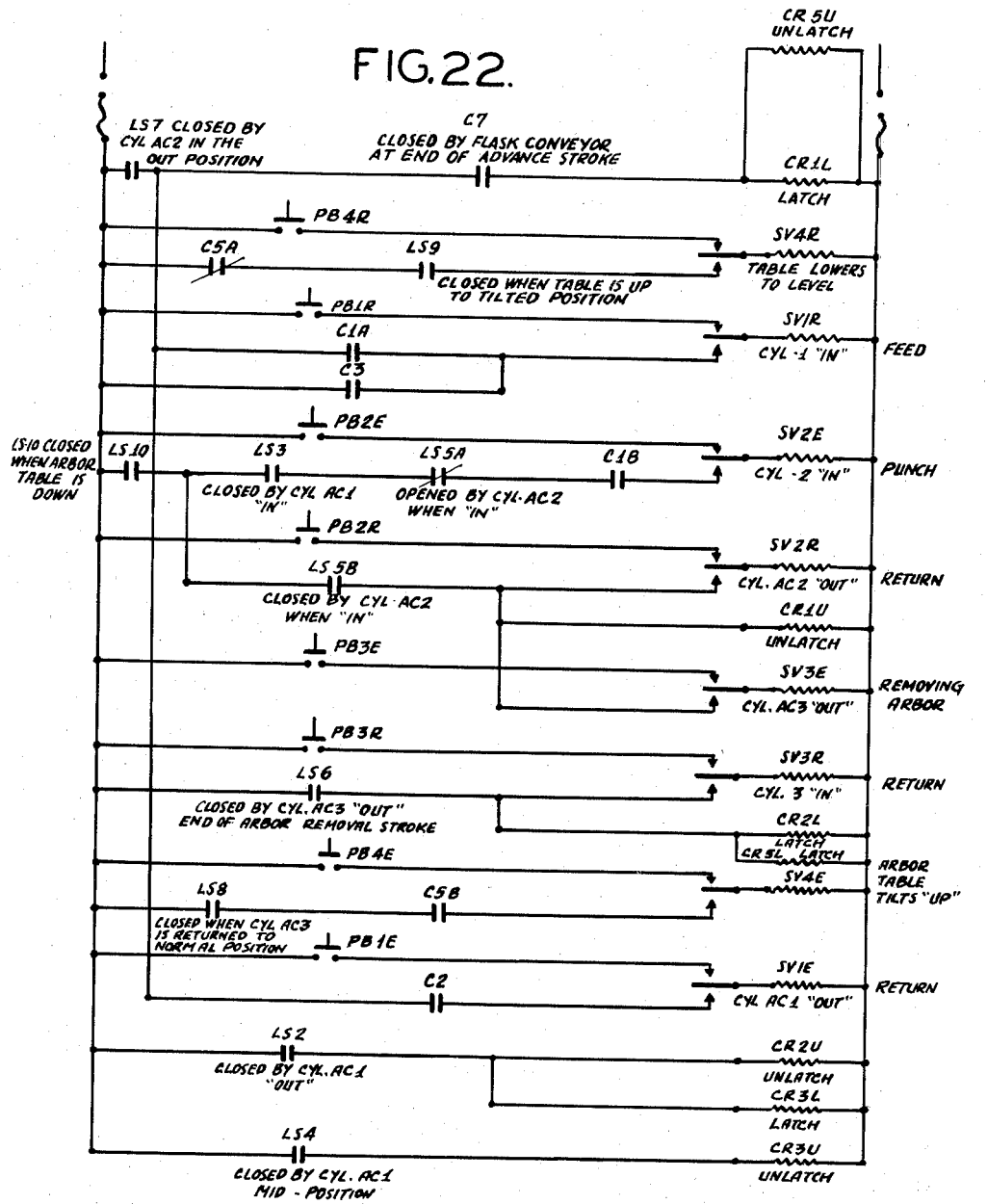

United States Patent Office 2,841,840
Patented July 8, 1958

2,841,840

AUTOMATIC APPARATUS FOR REMOVING CORE ARBORS FROM FOUNDRY FLASKS

William G. Reichert, Newark, N. J.

Application August 13, 1954, Serial No. 449,655

6 Claims. (Cl. 22—93)

This invention relates to an automatic method and an apparatus for removing core arbors from foundry flasks.

In the art of casting pipes, it is generally the practice to form the hollow interiors of the pipe castings by means of longitudinal cores or arbors made of metal. The arbors are allowed to remain in the castings while the latter cool in the mold flasks and are usually not removed for some time until the castings are removed from the flasks. If the arbors are allowed to remain in the castings as the latter cool, the heat of the cast metal is transferred to the arbors and the latter will finally attain a temperature of about 450° F.

This high temperature inevitably causes the arbors to warp and requires an expensive and time-consuming straightening operation to be performed on the arbors before they are fit for re-use. It has been discovered that the arbors may be removed from the castings only thirty to fifty seconds after the molten casting metal has been poured into the mold flasks. In this short time interval, the arbors reach a temperature of only 120° F. to 140° F. and hence warping is prevented and the arbors may be re-used without the necessity for a straightening operation.

It is therefore a primary object of the present invention to provide a method and an apparatus for removing the arbors from the castings while the latter are still cooling in the mold flasks.

A further object is to provide an apparatus of the character described and comprising a flask support, flask-engaging means for moving a flask containing a core arbor onto said support and arbor-engaging means for urging said arbor outwardly of the flask, said flask-engaging means including means for removing the flask from said support.

Another object is to provide an apparatus of the character described wherein said arbor-engaging means comprises punch-out means adapted to push against one end of the arbor for urging the latter longitudinally until the opposite end of the arbor projects outwardly of the flask, and draw means engaging said outwardly projecting opposite end of the arbor for pulling the latter longitudinally outwardly until the entire arbor is removed from the flask.

Still another object is to provide an apparatus of the character described and comprising an arbor support located to receive and support the arbor removed from the flask by said flask-engaging means, and means movably mounting the arbor support for movement from a first position for receiving the arbor to a second position for discharging the arbor from said arbor support.

A further object is to provide a device of the character described and comprising a flask conveyor for conveying a series of flasks in end-to-end relation, said flask-engaging means being mounted for reciprocal movement from a first position over said flask conveyor to a second position over said support to transfer a flask from the conveyor to the support and then back again to said first position to replace the flask on the flask conveyor.

Another object is to provide an apparatus of the character described and comprising an arbor cooling means, and an arbor conveyor for carrying the arbors removed from the flasks to said arbor cooling means.

Still another object is to provide a novel means for automatically controlling the operation of the various operative components of the apparatus in a predetermined sequence.

Still another object is to provide an automatic control means comprising fluid-actuated means for operating said components, and electrical control means for automatically controlling the operation of said fluid-actuated means.

A further object is to provide that said fluid-actuated means includes valves controlling the operation of the latter, said electrical control means comprising solenoids controlling the operation of said valves, and electrical circuit means for energizing said solenoids in a predetermined sequence.

A further object is to provide that said automatic control means includes means for manually controlling the operation of the various operative components of the device when automatic operation is not desired.

Another object is to provide that said automatic control means comprises an electrical circuit having a plurality of limit switch means actuable in response to operation of said operative components for controlling the operation of each of said components in response to the operation of the other of said components, whereby each step of the cycle of operation of the device will not be commenced until the preceding step has been completed.

Another object is to provide an arbor engaging means of the character described and comprising a punch member, means mounting the punch member for reciprocal movement axially of the arbor, and actuating means for advancing the punch member in one direction through one of the open ends of the flask and into engagement with one end of the arbor to urge the opposite end of the arbor outwardly of the opposite open end of the flask and then retracting the punch in the opposite direction to withdraw the punch member from the flask.

Still another object is to provide a draw means of the character described and comprising a catch member engageable with said opposite outwardly projecting end of the arbor, means mounting said catch member for reciprocal movement axially of the arbor toward and away from said flask, and a second actuating means for advancing said catch member away from said flask to pull the arbor outwardly therefrom until the entire arbor is removed from the flask and then retracting said catch member to disengage the latter from the arbor.

Still another object is to provide an arbor support of the character described in the form of a table located adjacent said opposite open end of the flask and beneath the path of movement of said catch member for receiving the arbor when the latter is moved outwardly of the flask, means pivotally mounting the table for movement from a horizontal position for receiving the arbor to a tilted position for discharging the arbor from the table, and a third actuating means for moving the table to each of said positions.

A further object is to provide a device of the character described wherein said arbor cooling means comprises a quench tank adapted to contain a quenching fluid, and an arbor conveyor extending through said quench tank for conveying therethrough the arbors discharged from said table.

Still another object is to provide a device of the character described wherein said flask-engaging means to be mounted for reciprocal movement from a first position over said flask conveyor wherein the flask engaging means receives a flask to a second position over said flask support to transfer the flask from the conveyor to the support and then back in the opposite direction beyond said first position to a third position to replace the flask on said conveyor and then back again in the first direction to said first position to receive the next succeeding flask.

Other objects and advantages of the present invention are inherent in the structure as disclosed and claimed or will become apparent to those skilled in the art as the detailed description proceeds in connection with the accompanying drawings wherein:

Fig. 1 is a top plan view of an apparatus embodying the present invention;

Fig. 2 is a side elevational view of the apparatus;

Fig. 3 is an end elevational view of the apparatus with parts broken away for clarity in illustration;

Fig. 4 is a top plan detailed view of the punch-out means, the mounting means for guiding the punch-out means for reciprocal movement, and the air cylinder for reciprocating the punch-out means;

Fig. 5 is an end elevational view of the structure shown in Fig. 4;

Fig. 6 is an end elevational view showing the draw means including the pivotally mounted arbor-engaging catch member;

Fig. 7 is a side elevational view of the structure shown in Fig. 6;

Fig. 8 is a top plan view of a frame for the apparatus including the pivotally mounted table for receiving the punch-out arbors;

Fig. 9 is a side elevational view of the frame shown in Fig. 8;

Fig. 10 is a top plan view showing a punch-out head having four punch out members for punching out four arbors employed for pipe castings of two-inch diameter as distinct from the punch-out head shown in Fig. 4 which punches out two arbors for pipe castings of four-inch diameter;

Fig. 11 is an end elevational view of the punch-out head of Fig. 10;

Fig. 12 is a top plan view of a punch-out head having three punch-out members for removing three arbors of three-inch diameter simultaneously from the flask;

Fig. 13 is a side elevational view of the catch element adapted to be used with the punch-out head of Fig. 10 for drawing out simultaneously four arbors employed for pipe castings of a two-inch diameter;

Fig. 14 is a side elevational view similar to Fig. 13 but showing a different catch element adapted to be employed with the punch-out head of Fig. 12 for drawing out three arbors of a three-inch size;

Fig. 15 is a vertical sectional view on line 15—15 of Fig. 13;

Fig. 16 is a vertical sectional view on line 16—16 of Fig. 1 and shows the flask-engaging means for moving the flask from the flask conveyor onto the flask support;

Fig. 17 is a longitudinal vertical sectional view through a flask showing a core arbor and a pipe casting surrounding the arbor;

Fig. 18 is a longitudinal horizontal sectional view on line 18—18 of Fig. 17;

Fig. 19 is a transverse vertical sectional view taken on the line 19—19 of Fig. 17;

Fig. 22 is a schematic electrical circuit diagram of the automatic control means for the device.

Figure 20:
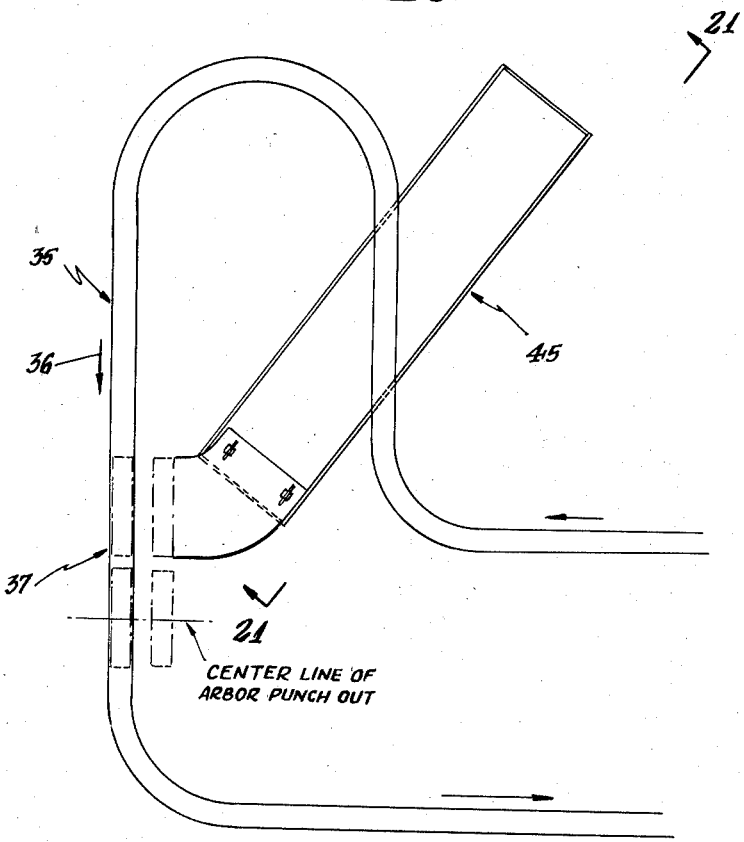
Fig. 20 is a top plan schematic view showing the relation of the apparatus of Fig. 1 to the flask conveyor and the arbor quench tank.

Referring now to the drawings in more detail, the general overall operation of the apparatus embodying the present invention will first be briefly described. As shown in Figs. 17 and 19, a flask indicated generally by the reference numeral 31 and having therein a plurality of core arbors 32 surrounded by a pipe casting 33 and molding sand 34 is carried by a conveyor indicated generally at 35 in Fig. 20. Conveyor 35 moves in the direction of arrow 36 to convey the flask 31 toward the apparatus embodying the present invention and indicated generally at 37. The flasks 31 are filled with the molding sand and have molten casting metal poured therein to form the pipe castings 33 by any suitable means which form no part of the present invention and hence will not be described.

Referring now to Fig. 1, the flask 31 is moved by conveyor 35 from the position indicated in dash-dot lines at 31a to an initial position at 31b within the apparatus 37. A flask-engaging means comprising a puller frame 38 is then retracted by an air cylinder AC1 to move flask 31 to a position indicated at 31c on a flask support 39. A punch-out means 40 is then urged outwardly by an air cylinder AC2 to push the ends of arbors 32 outwardly of the flask 31. The outwardly projecting ends of arbors 32 are then engaged by a draw means indicated generally at 41 which is moved outwardly to the right as viewed in Fig. 1 by a third air cylinder AC3 so as to pull the arbors 32 completely out of the flask 31 and onto an arbor table 42.

Figure 21:
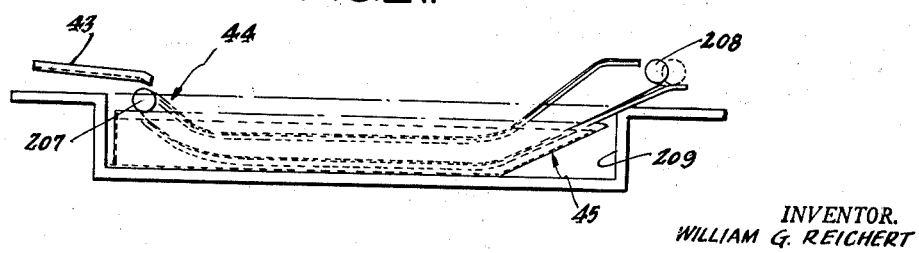
Fig. 21 is a view of the quench tank and arbor conveyor extending therethrough and is taken on line 21—21 of Fig. 20.

A fourth air cylinder AC4 is then actuated to tilt arbor table 42 so as to cause the removed arbors 32 to roll onto an inclined chute 43. As best seen in Fig. 21, the arbors roll down chute 43 onto an arbor conveyor 44. The latter conveys the arbors 32 through a quenching fluid located in a quench tank 45 and then to a point where the arbor may be reused in the casting operation with other mold flasks 31.

Air cylinder AC1 is then actuated to move puller frame 38 back toward its initial extended position so as to move flask 31 back to the position indicated at 31b on the conveyor 35. The latter is then indexed to move the flask 31 (from which the arbors 32 have been punched out) to the position indicated at 31d and also to move the next succeeding flask section from position 31a to position 31b within the puller frame 38. The above-described cycle of operations is then repeated, it being understood that conveyor 35 carries a series of flasks 31 in end-to-end relation so as to subject the series of flasks 31 successively to the operation of apparatus 37 in the manner described above.

Referring again to Figs. 17 and 19 in conjunction with Fig. 18, each of the mold flasks 31 comprises an upper cope section 31' assembled on top of a lower drag section 31". The cope section 31' is substantially identical to the drag section 31" except, of course, that the latter is in inverted position with respect to the former. Each of the sections 31', 31" is in the form of a rectangular frame having opposite side walls 46, 47 joined to a pair of opposite end walls 48, 49. All four walls are provided along their upper and lower edges with inwardly projecting flange portions 50, 51 extending continuously therearound.

Flange portions 51 are provided with a horizontal planar surface 52 which acts as the parting plane surface, it being understood that the surface 52 of cope section 31' rests upon the corresponding surface 52 of drag section 31". Side walls 46, 47 of each section 31', 31" are provided with longitudinal horizontal rib members 53, 54 which extend substantially throughout the length of walls 46, 47. End walls 48, 49 are provided with horizontal bars 55, 56 secured thereto respectively.

A trunnion indicated at 57, 58 is mounted to an intermediate portion of each of the bars 55, 56. Also secured to side walls 46, 47 and projecting outwardly therefrom are a plurality of lugs 59, 60 and 61, 62 each having a vertical bearing sleeve 63. The ribs 53, 54, bars 55, 56, trunnions 57, 58, and lugs 59 to 62 are utilized in manipulating flask sections 31', 31" by the aforementioned undisclosed means which fill the flask sections with molding sand, form the molding impressions in the sand, insert the core arbors 32 into the flasks 31 and pour the molten casting metal therein, as will be understood by those skilled in the art.

As seen in Fig. 17, the end walls 48, 49 are provided with openings at 64, 65 respectively, it being understood that the opening 64 of cope section 31' communicates with the opening 64 of drag section 31'' and cooperates therewith to form a single unitary opening at one end of the flask 31. In the same manner, the opening 65 of cope section 31' communicates with the adjacent opening 65 of drag section 31'' so as to form therewith a single unitary opening at the opposite end of the flask 31.

A plurality of arbor cores 32 are provided, each being placed within a respective one of the several mold impressions or cavities formed in the molding sand 34. Each of the arbor cores 32 is in the form of a longitudinal hollow cylindrical member of metal and has at its rear end an enlarged cylindrical portion 66 adjacent a smaller enlarged cylindrical portion 67. The forward end of each arbor 32 (at the left as viewed in Fig. 17) is provided with an enlarged cylindrical portion 68. The end shoulder 69 of portion 66 is spaced inwardly from the extreme rear end 70 of core 32 and the end shoulder 71 of portion 68 is similarly spaced inwardly from the extreme forward end 72.

The entire cylindrical exterior surface of core 32 from shoulder 69 to shoulder 71 thereof is coated with a layer of core sand 73. The pipe casting 33 is formed at its rear end with an enlarged shell portion 74 having an outwardly projecting flange 75. The forward end of pipe casting 33 is provided with a flange 76. The internal diameter of casting 33 is greater than the external diameter of arbor portion 68 whereby the front end 72 of arbor 32 may be pushed rearwardly by punch-out means 40 to cause the core sand 73 to crumble and to move arbor 32 axially through the interior of the hollow pipe casting 33 until the rear end portions 66, 67 of arbor 32 project outwardly of flask 31.

Referring now to Figs. 8 and 9, there is disclosed a frame indicated generally at 75 for supporting the flask support 39 and the arbor table 42. Frame 75 comprises four vertically extending angle elements 76, 77, 78, 79. The lower ends of angle elements 76, 78 are secured to a transversely extending horizontal angle element 80 adapted to rest upon the floor surface indicated at 81. Another transverse horizontal angle element 82 rests on floor 81 and is secured to the lower ends of vertical angle element 77, 79. The upper ends of elements 76, 78 are secured to a transverse horizontal angle element 83 and the upper ends of elements 77, 79 are similarly secured to another angle element 84.

A longitudinal member 85 extends between and is secured to the upper ends of elements 76, 77 and another longitudinal member 86 is likewise secured to the upper ends of elements 78, 79. A flat horizontal plate 87 is mounted on transverse angle elements 83, 84 and longitudinal members 85, 86. Cross braces 88a, 89a extend between longitudinal members 85, 86 and are secured thereto at their opposite ends for rigidifying the frame structure and providing further support for plate 87. The latter provides a smooth planar horizontal surface adapted to support flask 31.

Secured to angle element 84 is a shorter transverse angle element 88. At the right-hand end of frame 75 are a pair of vertical members 89, 90 as best seen in Fig. 3, and are secured at their upper ends to a transverse horizontal angle element 91. Intermediate portions of members 89, 90 are secured to the opposite ends of a transversely extending angle element 92 and the lower portions of members 89, 90 are similarly fastened to angle element 93 mounted on the surface of floor 81. A pair of longitudinal members 94, 95 are secured at their left-hand ends to the opposite ends of angle element 88 and at their right-hand ends to members 89, 90 by gussets 96, 97.

Arbor table 42 comprises a flat horizontal plate 98 having a vertically extending flange 99 along one edge thereof. Another flange 100 extends vertically along the right-hand edge of plate 98. Flanges 99, 100 serve as stops to prevent the arbors 32 from rolling or otherwise falling from arbor table 42. A series of four hinges 101, 102, 103, 104 are secured to longitudinal member 94 and arbor table 42 so as to mount the latter for tilting movement about a horizontal axis extending along the edge 105 of arbor table 42. Secured to the under surface of arbor table 42 at an intermediate portion thereof is an apertured lug 106 for a purpose to be described below.

Referring again to Figs. 1 to 3 inclusive, another support frame indicated generally at 110 straddles the flask support portion 39 of frame 75 and also the adjacent portion of conveyor 35. Frame 110 comprises four vertical members 111, 112, 113, 114 at the four corners thereof. The lower ends of members 111, 113 are joined by a transverse angle member 115 and the lower ends of members 112, 114 are similarly secured to a transverse angle member 116. A pair of channel members 117, 118 extend between and are fixedly secured to the upper ends of vertical members 111, 112 and 113, 114 respectively. A transversely extending pair of channel members 119, 120 are also secured to the upper ends of members 111, 113, and 112, 114 respectively. The channel members 117 to 120 form a rectangular frame at the upper ends of said vertical members 111 to 114.

A pair of spaced parallel guide rods 121, 122 extend horizontally across frame 110 and are secured to channel members 117, 118 at their opposite ends. Guide rods 121, 122 serve as a means for slidably mounting the puller frame 38 for reciprocal sliding movement. As best seen in Figs. 1 and 16, puller frame 38 comprises a pair of spaced parallel angle elements 123, 124 and transverse angle elements 125, 126 extending between and fixedly secured to elements 123, 124 so as to form therewith an approximately rectangular frame. It will be noted that the outer ends of angle elements 123, 124 extend outwardly beyond elements 125, 126 and are provided with bearing sleeves 127, 128, 129, 130 fixedly secured thereto. Bearing sleeves 127, 129 slideably receive guide rod 121 and bearing sleeves 128, 130 are likewise slideably mounted on guide rod 122. It will thus be seen that puller frame 38 is mounted to guide rods 121, 122 for reciprocal sliding movement in a transverse direction.

A series of four vertical flask-engaging elements 131, 132, 133, 134 are secured at their upper ends to the junctions of elements 125, 126 with elements 123, 124 and extend downwardly therefrom. Elements 133, 134 are spaced in the transverse direction from their respective elements 131, 132 a distance slightly greater than the width of the flask 31. In actual practice, this difference is preferably approximately eight inches so that when flask 31 is moved between elements 131, 132 and elements 133, 134 by conveyor 35, there will be a clearance space between elements 131, 132 and the adjacent lateral side of the flask 31 of approximately four inches and a similar clearing space is provided between the opposite side of the flask 31 and elements 133, 134.

Cylinder AC1 is secured at its opposite ends by brackets 140, 141 to a horizontal support 142. The inner end of the latter is fixedly secured to an angle element 143 mounted to vertical members 113, 114 of frame 110. The outer end of support 142 is secured by gussets 144 to the upper ends of vertical legs 145 joined at their lower ends by a transverse angle element 146.

Cylinder AC1 is provided therein with a reciprocally slidable piston (not shown) connected to a piston rod 147 having an outer end extending through an opening provided in member 124 of puller frame 38 and secured thereto by a nut 148 mounted on a reduced threaded end portion of piston rod 147. It will thus be seen that when the supply of air to cylinder AC1 is regulated to move its piston toward the retracted position (toward the viewer as seen in Fig. 2), piston rod 147 will be retracted so as to urge puller frame 38 from the position shown in Fig. 1 to a retracted position over the flask support 39. During this retracting movement of puller frame 38, the vertical flask-engaging elements 131, 132 of the latter will engage the adjacent lateral side of flask 31 so as to move the latter therewith from its position indicated at 31b on conveyor 35 to a position indicated at 31c on the flask support 39. It will be obvious that when puller frame 38 is moved back to its extended position by cylinder AC1, the other pair of vertical flask engaging elements 133, 134 will engage the opposite side of flask 31 so as to move the latter from the position 31 back to the position 31b on conveyor 35.

In view of the clearing space of approximately four inches between the flask engaging elements 131 to 134 and the respective adjacent lateral sides of flask 31, it will be necessary for puller frame 38 to move outwardly beyond its initial position in order to return flask 31 from the position 31c to the position 31b. That is, in the initial position of puller frame 38, conveyor 35 moves flask 31 to a position 31b midway between elements 31 and 33 and also midway between elements 132 and 134 so as to provide a four-inch clearance space on both lateral sides of flask 31. However, when puller frame 38 returns flask 31 back to the position 31b from position 31c, flask engaging elements 133, 134 are in contact with the adjacent lateral side of flask 31 and hence puller frame 38 must extend outwardly beyond its initial position in order to return flask 31 back to the position 31b. It will thus be seen that puller frame 38 has three different positions: an initial position for receiving flask 31 when conveyor 35 is indexed to move flask 31 into puller frame 38, a retracted position to place flask 31 on flask support 39, and a third poistion beyond and at a greater extension than said initial position.

The punch-out cylinder AC2 is mounted on a horizontal support 150 having one end fixedly secured to the end of flask support 39. The outer end of support 150 is mounted to the upper ends of vertical leg members 151 braced at their lower ends by a transverse angle element 152. As shown in Fig. 5, support 150 is of inverted channel shape and is provided along its lateral sides with downwardly extending flange portions 153, 154. Fixedly secured to the latter are a pair of brackets 155, 156 for mounting thereon a pair of bearing sleeves 157, 158 respectively. The latter are provided with horizontally extending cylindrical openings therethrough for slidably receiving a pair of guide rods 159, 160. The inner ends of rods 159, 160 are fixedly secured to a punch head 161 of substantially rectangular shape. A pair of internally threaded members 162, 163 are welded to the outer face 164 of punch head 161 and threadedly receive suitable threaded portions on the ends of guide rods 159, 160 so as to fixedly secure the latter to punch head 161.

A punch mounting plate 165 of substantially the same size and shape as head 161 is removably secured thereto by four screws indicated at 166. Fixedly secured to the inner face 167 of mounting plate 165 are a plurality of punches indicated generally by the reference numeral 168. Each of the latter comprises a hollow cylindrical tube 169 welded at one end to surface 167 of mounting plate 165 and projecting horizontally therefrom. The opposite end of each tube 169 has fixedly secured therein a cylindrical punch element 170 projecting outwardly from tube 169 to engage the forward end 72 of a respective one of the arbors 32 within flask 31.

Air cylinder AC2 is provided therein with a reciprocally slidable piston (not shown) connected to a piston rod 171, the latter in turn having a reduced threaded portion in threaded engagement within a collar member 172 welded to the outer face 164 of punch head 161. It will thus be seen that the air supply to cylinder AC2 may be controlled so as to reciprocate punch head 161 together with mounting plate 165 and punches 168 in a direction toward and away from the forward end of flask 31 when the latter is mounted on flask support 39. The stroke of piston rod 171 is of a length to cause punches 168 to push on the forward end 172 of arbors 32 to move the latter outwardly through the openings 64 in the rear end walls 48 of flask 31 until the rear ends 70 of arbors 32 project outwardly of flask 31 a distance of approximately eighteen inches.

In Figs. 4 and 5 there are shown two punches 168 adapted to be used when flask 31 contains two arbors 32 of a size for molding four-inch diameter pipe castings 33. It will be obvious that the number and size of punches 168 may be varied to accommodate flasks having arbors of a different size or a greater or lesser number of arbors. For example, as shown in Figs. 10 and 11, the punch mounting plate 165' is substantially identical to mounting plate 165 of Figs. 4 and 5. However, instead of two punches of a four-inch size, mounting plate 165' has mounted thereon a series of four punches 168' of a size for engaging arbors employed in casting pipes of a two-inch diameter, there being four punches 168' since it is preferable to have four two-inch arbors within a single flask in view of the lesser space occupied by the smaller castings.

Punches 168' are similar in construction to punches 168 and comprise a solid cylindrical bar 169', each of the latter having fixedly mounted in its outer end a punch element 170' with a conical point 171' adapted to enter the open forward end of the two-inch arbor to properly align punch element 170' with respect thereto and to prevent disengagement of punch element 170' and the arbor. As shown in Figs. 4 and 5, punch elements 170 are provided with beveled ends at 171a adapted to partially enter the opened forward end 72 of the respective arbor 32 for the same purpose as portions 171'. Brass collars B, B', B'' may be force fitted on punches 170, 170', 170'', respectively, to act as a thrust take up member to contact arbors without damaging the same.

Referring now to Fig. 12, there is disclosed a punch mounting plate 165'' similar in construction to plates 165, 165' described above. A series of three punches 168'' are mounted to plate 165'' and are substantially identical to punches 168 of Figs. 4 and 5 except that they are of a size to coact with arbors for casting pipe of a three-inch diameter. Punches 168'' each comprise a hollow cylindrical tube 169'' having a punch element 170'' in the outer end thereof, as described above with respect to Figs. 4 and 5.

It will thus be seen that the punch-out means 40 actuated by cylinder AC2 serves to push on the forward ends 72 of arbors 32 to push the rear ends 70 of the latter outwardly of the rear open ends of flask 31 a distance of approximately 18 inches. The draw means 41 which engages the outwardly projecting rear ends of the arbors 32 and pulls them completely out of flask 31 will now be described in more detail.

Referring now to Figs. 1 and 2, a pair of vertical members 175, 176 are secured at their lower ends to frame member 120 and project upwardly therefrom. The upper ends of members 175, 176 are provided with suitable apertures receiving the inner ends of a pair of spaced parallel guide rods 177, 178 extending therethrough and fixedly secured thereto by any suitable securing means. The outer ends of guide rods 177, 178 are similarly fastened to transverse angle member 91 of frame 75.

As best seen in Figs. 6 and 7, a transversely extending channel member 179 has fixedly secured thereto a pair of bearing sleeves 180, 181 slidably mounted on guide rods 177, 178 respectively. Secured to the opposite ends of channel member 179 are a pair of vertical angle elements 182, 183 extending downwardly therefrom and provided with flanges 184, 185 extending in mutually spaced parallel relation. A pair of bearings 186, 187 are welded to flanges 184, 185 for rotatably mounting the opposite ends of a horizontally extending pin 188.

Rotatably mounted on pin 188 and extending between flanges 184, 185 is a catch element indicated generally at 189 for engaging the outwardly projecting ends of arbors 32. Catch element 189 comprises a plate portion 190 having along its upper edge a horizontally extending hollow cylindrical portion 191 through which pin 188 extends. Plate portion 190 is provided with a pair of approximately semi-circular cutouts or recesses 192 extending upwardly from its lower edge 193. Each recess 192 is of a diameter slightly larger than the diameter of the intermediate portion of each arbor 32 but less than the external diameter of the enlarged portion 67 thereof. It will thus be seen that the intermediate portion of each arbor 32 may fit within a respective one of the recesses 192 as shown in Fig. 6, the rear face 194 of plate 190 being adapted to abut against the shoulder 67a of the enlarged portion 67 of arbor 32 so that when catch element 189 is moved rearwardly or outwardly away from flask 31, arbors 32 will be pulled therewith so as to be completely removed from flask 31.

As shown in Fig. 7, catch element 189 is rotatable about the axis of pin 188 in an upward rearward direction toward the position indicated in dash-dot lines at 189'. A pair of stop members 195, 196 are mounted to the lower ends of vertical angle elements 182, 183 and engage the front face 197 of catch element 189 to prevent pivotal movement of the latter in the forward direction (to the left as viewed in Fig. 7). It will thus be seen that when punch-out means 40 pushes arbors 32 rearwardly outwardly of flask 31, the outwardly projecting rear ends 70 of arbors 32 will engage catch element 189 and pivot the latter upwardly toward the position indicated at 189' so as to permit the arbors 32 to slide beneath and ratchet past the catch element 189. After the enlarged shoulder portion 67 of arbors 32 has passed catch element 189, the latter is then free to pivot downwardly toward the vertical position so as to cause the intermediate portions of arbors 32 to be received within the recesses 192.

Air cylinder AC3 is mounted at one end by a bracket 200 to a support 201 fixedly secured to the transverse channel member 119. The opposite end of cylinder AC3 is fixedly mounted to channel member 120 by a bracket 202 between vertical members 175, 176. Air cylinder AC3 is provided with a piston reciprocally slidable therein and connected to channel member 179 of draw means 41 by a piston rod 203. Cylinder AC3 may be actuated to move draw means 41 outwardly away from flask 31 along the guide rods 177, 178 and over the arbor table 42. During this extending movement, the rear face 194 of catch element 189 will engage the shoulders 67a of the partially projecting arbors 32 so as to pull the latter completely out of the flask 31 and deposit them upon the arbor table 42. Cylinder AC3 is then actuated to retract draw 41 to the initial position shown in Fig. 1 ready to receive the next set of arbors 32 pushed partially outwardly of the rear end of flask 31 by the punch-out means 40.

Referring now to Figs. 13 and 15, there is shown a catch element indicated generally at 189' and constructed substantially similar to catch 189 except that the plate portion 190' thereof is provided with four cut-out or recesses 192' of a size adapted to engage two-inch arbors instead of the four-inch arbors engaged by catch element 189. Fig. 14 shows still another catch element 189" similar to catch elements 189, 189' except having a plate portion 190" with a series of three cut-outs or recesses 192" of a size to engage three-inch arbors. Except for the number and size of the recesses, the catch elements 189, 189', 189" are substantially identical and are interchangeable to adapt the apparatus for processing flasks 31 having arbors therein of various sizes. It will be obvious that catch element 189 is employed with punches 168 of Figs. 4 and 5, catch element 189' is employed with punches 168' of Fig. 12.

The arbor table 42 is pivoted upwardly toward its tilted position indicated in dash-dot lines in Fig. 3 at 42' by an air cylinder AC4. The latter is provided with a piston (not shown) reciprocally slidable therein and having a piston rod pivotally connected at its outer end to the lug 106 secured to the lower surface of arbor table 42. The lower end of cylinder AC4 is pivotally mounted at 205 to a support 206 resting upon the ground.

When cylinder AC4 is actuated to tilt arbor table 42, the arbors 32 thereon will roll downwardly over the hinged edge 105 of table 42 and onto the chute 43 and then down the latter onto an endless continuous conveyor 44 mounted on sprocket wheels 207, 208 as shown in Fig. 21. Conveyor 44 carries the arbors through quench tank 45 where the arbors 32 are cooled and wetted so as to be suitable for re-use. Quench tank 45 is shown located within a recessed pit 209.

The apparatus of the present invention thus removes the core arbors from the mold flasks approximately thirty to fifty seconds after the molten casting metal has been poured into the flasks. In this short time interval after the pouring operation, the arbors heat to a temperature of only 120 degrees F. to 140 degrees F. whereas if the arbors were left within the castings until the latter solidified enough to be removed from the flask, as is the conventional practice, the arbors would eventually reach a temperature of 450 degrees F. to 500 degrees F. This high temperature would cause warping of the arbors and require that they be straightened out after each use.

By removing the arbors when they are still at a temperature of 120 degrees F. to 140 degrees F., warping is prevented and the straightening operation is thus completely obviated. Since the present invention obviates the necessity for straightening the arbors, the latter may be re-used over and over again approximately every half hour and considerable economy is effected by eliminating the problems and disadvantages that normally arise from warped arbors. The quenching operation in quench tank 45 provides the double function of cooling the arbors and also moistening or wetting the latter. In order to be fit for re-use, the arbors must be at approximately room temperature and must also be slightly moistened.

The automatic control system for actuating the four cylinders AC1, AC2, AC3, AC4 and thereby controlling the operation of the several operative components of the apparatus will now be described. This automatic control system comprises a plurality of limit switches shown in Figs. 1 and 2. A limit switch LS2 is mounted on the end of member 120 and is engaged by a suitable actuating member (not shown) secured to puller frame 38 whereby when the latter is in the extreme extended position limit switch LS2 will be engaged and actuated. Another limit switch LS4 is mounted to member 120 adjacent limit switch LS2 when puller frame 38 is in its initial position ready to receive the next flask 31 moved therein by conveyor 35 when the latter undergoes an indexing movement. A third limit switch LS3 is mounted on the opposite end of member 120 and is actuated when puller frame 38 reaches the fully retracted position to place the flask 31 on flask support 39 in the position indicated at 31c.

A limit switch LS8 is actuated by draw means 41 when the latter is in its initial retracted position adjacent the flask 31 at the position 31c. At the opposite end of arbor table 32, another limit switch LS6 is actuated by draw means 41 when the latter reaches its extreme extended position to place the arbors 32 on arbor table 42. Below limit switch LS6 are limit switches LS9 and LS10 (shown in Fig. 2) actuated by engagement with arbor table 42 when the latter is moved to its tilted and horizontal positions, respectively.

Mounted on support 150 are a pair of limit switches LS7 and LS5. The former is actuated by engagement with punch-out means 40 in the retracted position. When punch-out means 40 reaches its extended position adjacent flask 31 on flask support 39, limit switch LS5 is actuated thereby.

Referring now to Fig. 22, the schematic circuit diagram of the automatic control system there shown includes conventional symbols generally employed by those skilled in the art. The retracting and extending movements of the pistons within the various air cylinders are controlled by solenoid valves each having a retracting coil which when energized operates the solenoid valve to cause the piston of the particular air cylinder to move toward the retracted position and an extending coil which when energized moves the piston in the opposite direction toward the extended position. The different coils for each cylinder are designated "R" and "E" respectively. For example, the solenoid valve coils of cylinder AC1 are designated SV1R and SV1E respectively.

A series of control relays are provided and indicated by the reference designations "CR." These control relays, when energized, will open the normally closed sets of contacts associated therewith and will close the normally open contacts if the relays are of the "latch" type indicated by the reference designation "L." If the relays are of the "unlatch" type indicated by the reference Letter "U," they will have the opposite effect upon their associated contacts when energized. The various sets of contacts associated with each control relay are indicated by the letter "C" followed by a reference numeral to indicate the particular control relay associated therewith. When several sets of contacts are associated with the same control relay, they are differentiated by the letters "A," "B," etc. The symbol for a set of normally open contacts is the conventional pair of spaced parallel vertical lines whereas if the contacts are of the normally closed type the vertical lines are crossed by a diagonally extending line. Where a limit switch is provided with two sets of contacts, each set is differentiated from the other by a letter designation, such as "A," or "B."

When punch-out means 40 is in the retracted position shown in Fig. 1, limit switch LS7 is closed. At the end of each indexing movement of conveyor 35, a control relay (not shown) forming part of the control system for the conveyor mechanism is energized to close contacts C7. This completes an energizing circuit through LS7 and C7 to energize latch control relay CR1L and unlatch control relay CR5U. Energization of the latter allows the normally closed contacts C5A to close. Limit switch LS9 is closed when arbor table 42 is in the tilted position. A circuit is established through C5A and LS9 to energize solenoid valve coil SV4R, thereby causing the piston of cylinder AC4 to move downwardly and thereby lower arbor table 42 to the horizontal position.

The normally open contacts C1A were closed by energization of latch relay CR1L, thereby establishing an energizing circuit through LS7 and C1A to solenoid valve coil SV1R. Energization of the latter causes the piston of cylinder AC1 to retract thereby moving puller frame 38 from the initial position shown in Fig. 1 to the retracted position as to move a flask 31 from the position 31b on conveyor 35 to the position 31c on flask support 39.

When arbor table 42 lowers to the horizontal position it closes limit switch LS10. Limit switch LS3 is closed when puller frame 38 reaches the retracted position. The normally closed contacts LS5A of limit switch LS5 remain closed until punch-out means 40 reaches its extended position. Contacts C1D were closed by the energization of latch relay CR1L. A circuit is thus established through LS10, LS3, LS5A and C1B to energize solenoid valve coil SV2E thereby causing the piston of the punch-out cylinder AC2 to move toward the extended position during which movement the punches of the punch-out means 40 will engage the forward ends of arbors 32 and push them rearwardly until the rear ends of arbors 32 project approximately 18 inches outwardly of the rear end of flask 31.

At the end of the extending stroke of punch-out means 40, limit switch LS5 is actuated to close the normally open contacts LS5B. A circuit is thus established through LS10 and LS5B to energize solenoid valve coil SV2R to cause punch-out means 40 to be moved to the left as viewed in Figs. 1 and 2 toward its initial retracted position there shown. The same circuit also energizes the unlatched relay coil CR1U and the solenoid valve coil SV3E.

Energization of the latter causes draw cylinder AC3 to move draw means 41 outwardly toward the extended position to the right as viewed in Figs. 1 and 2. During this extending movement of draw means 41, catch element 189 thereof will engage the shoulders 67a at the rear ends of arbors 32 to pull the latter completely out of the flask 31 and onto the arbor table 42. Limit switch LS6 is closed when draw means 41 reaches the extreme extended position. This establishes an energizing circuit to solenoid valve coil SV3R controlling draw cylinder AC3 to retract draw means 41 back to the initial position shown in Figs. 1 and 2.

Closing of limit switch LS6 also energizes latch relay coil CR2L and latch relay coil CR5L. When draw means 41 reaches said initial retracted position, limit switch LS8 is closed thereby. The normally open contacts C5B are closed by the energization of latch relay coil CR5L. A circuit through LS8 and C5B is thus established to solenoid valve coil SV4E thereby causing the piston of cylinder AC4 to move upwardly and causing the arbor table 42 to tilt about its hinged edge to discharge the arbors 32 therefrom.

The energization of latch relay coil CR2L causes the normally open contacts C2 to close to establish an energizing circuit to solenoid valve coil SV1E thus actuating cylinder AC1 to cause puller frame 38 to be moved to the extreme extended position. When puller frame 38 reaches said extended position, flask 31 will have been moved from the position 31c on flask support 39 back to the position 31b on conveyor 35. The arrival of puller frame 38 at this extreme extended position closes limit switch LS2 thereby establishing an energizing circuit to the unlatch relay coil CR2U and also the latch relay coil CR3L.

The normally open contacts C3 are thus closed to energize SV1R and cause the puller frame 38 to be moved inwardly from its extreme extended position. When puller frame 38 reaches the initial position in which it is properly aligned to receive the next succeeding flask 31 moved therein by conveyor 35, limit switch LS4 is closed. It will be noted that limit switch LS4 is of the type which is actuated only when its actuating member on puller frame 38 moves in a particular direction and is not actuated when said member moves in the other direction. The closing of LS4 establishes an energizing circuit to the unlatch relay coil CR3U thus opening the normally open contacts C3 and de-energizing solenoid valve coil SV1R to stop the retracting operation of cylinder AC1 and thereby stop the retracting movement of puller frame 38 when the latter reaches said initial position over conveyor 35. The apparatus is now in its initial condition and the above-described cycle of operations may be repeated after conveyor 35 completes its indexing movement to bring the next succeeding flask into puller frame 38 and thereby close contacts C7.

It is frequently desirable to control the operation of the various cylinders AC1, AC2, AC3, AC4 manually instead of automatically in the manner described above, as for example, when setting-up or adjusting the apparatus. To accomplish this end, a series of push-button switches are provided and indicated in Fig. 22 by the reference designation "PB" followed by a numeral and the letter "R" or "E" to designate the respective solenoid valve coil associated with and energized by each push-button. For example, when push-button switch PB4R is manually depressed, an energizing circuit is thereby established to solenoid valve coil SV4R to move the piston of cylinder AC4 to the retracted position and thereby lower arbor table 42. Manual depression of the other seven push-button switches will energize their respective solenoid valve coils in series therewith and thereby permit manual control of the various operative components of the apparatus. The solenoid valve coils will remain energized only so long as manual pressure is maintained on the push-button switches to keep the latter depressed and closed.

It is understood that the specific embodiment of the invention shown in the drawing and described in detail above is merely illustrative of one of the many forms which the invention may take in practice without departing from the scope thereof as delineated in the appended claims.

Having thus described the invention in some detail what I claim as new and desire to secure by Letters Patent of the United States is:

1. An apparatus for removing a core arbor from a mold flask having opposite open ends, said apparatus comprising a support for holding said flask, a punch, means mounting the punch for reciprocal movement axially of the arbor, and actuating means for advancing the punch in one direction through one of the open ends of the flask and into engagement with one end of the arbor to push the opposite end of the arbor outwardly of the opposite open end of the flask and then retracting the punch in the opposite direction to withdraw the punch from the flask, a member engageable with said opposite outwardly-projecting end of the arbor, means mounting said member for reciprocal movement axially of the arbor toward and away from said flask, and a second actuating means controlled by operation of the first actuating means for automatically advancing said member away from the flask after the punch has been advanced, to pull the arbor outwardly therefrom until the entire arbor is removed from the flask and then retracting said member to disengage the latter from the arbor, a table located adjacent said opposite open end of the flask and beneath the path of movement of said member for receiving the arbor when the latter is moved outwardly of the flask, means pivotally mounting the table for movement from a horizontal position for receiving the arbor to a tilted position for discharging the arbor from the table, and a third actuating means controlled by operation of the second actuating means, for moving said table to each of said positions thereof.

2. An apparatus for removing a core arbor from a mold flask having opposite open ends, said apparatus comprising a flask conveyor for conveying a series of said flasks in end-to-end relation, a support for holding a flask, flask engaging means, means mounting the flask engaging means for reciprocal movement in a direction approximately transverse to said flask conveyor, actuating means for moving said flask engaging means in one direction from a first position directly over said flask conveyor to a second position over said flask support and then in the opposite direction beyond said first position to a third position and then in said one direction to said first position, actuating means for moving said flask engaging means to said positions thereof, a punch, and actuating means for advancing the punch in one direction through one of the open ends of the flask and into engagement with one end of the arbor to push the opposite end of the arbor outwardly of the opposite open end of the flask and then retracting the punch in the opposite direction to withdraw the punch from the flask, a member engageable with said opposite outwardly-projecting end of the arbor, means mounting said member for reciprocal movement axially of the arbor toward and away from said flask, and a third actuating means for advancing said member away from the flask to pull the arbor outwardly therefrom until the entire arbor is removed from the flask and then retracting said member to disengage the latter from the arbor, a table located adjacent said opposite open end of the flask and beneath the path of movement of said member for receiving the arbor when the latter is moved outwardly of the flask, means pivotally mounting the table for movement from a horizontal position for receiving the arbor to a tilted position for discharging the arbor from the table, a fourth actuating means for moving said table to each of said positions thereof, and automatic control means for controlling the operation of said four actuating means in a predetermined sequence.

3. A device for removing core arbors from mold flasks and comprising a flask support, flask-engaging means for moving a flask containing a core arbor onto said support, arbor-engaging means for urging said arbor outwardly of the flask, said arbor-engaging means comprising punch-out means engaging one end of the arbor for pushing the latter longitudinally until the opposite end of the arbor projects outwardly of the flask, and draw means engaging said outwardly projecting opposite end of the arbor for pulling the latter longitudinally outwardly until the entire arbor is removed from the flask, said draw means comprising a member, means mounting said member for reciprocal movement axially of the arbor toward and away from said flask, a catch element, means pivotally mounting said catch element to said member and permitting said arbor to engage said catch element and ratchet past the latter as the arbor is moved outwardly of the flask by said punch-out means, said catch element having means for engaging an enlarged shoulder on said arbor outwardly-projecting end for moving the arbor longitudinally outwardly in response to movement of said member away from said flask.

4. In combination, a fixed supporting structure comprising a rectangular frame and a horizontal support beneath the front part of said frame, a pair of guide rods fixed to said frame and extending horizontally from front to rear, a member slidably mounted on said guide rods and movable from the rear position of the frame to the front position thereof over said horizontal support, a horizontal fluid cylinder fixed to the front of the support and extending forwardly thereof, a piston rod for said cylinder connected to said slidable member, said slidable member having downwardly extending means at the front and rear thereof for pulling a flask straddled by said slidable member forwardly of the frame and onto said horizontal support and rearwardly of the frame, off said support, punch-out means comprising a horizontal fluid cylinder disposed at right angles to the first cylinder and at one side of said frame and below said first cylinder and including a punch-out rod, controlled by a piston for said cylinder, adapted to partially punch out a core arbor from a flask on said horizontal support, a third cylinder mounted on top of said frame and supported by the side walls thereof and extending at right angles to the first cylinder and above the plane thereof and being disposed in a vertical plane passing through the axis of the second cylinder, a piston rod for said third cylinder, and means attached to said last piston rod and extending downwardly therefrom, adapted to engage the portion of the arbor punched out of the flask for withdrawing said partially withdrawn arbor from said flask, in combination with a table extending in end to end relation to said horizontal support and disposed on the opposite side of said support and adapted to receive the arbor withdrawn from the flask, said table being hinged about a longitudinal horizontal axis, and fluid means to tilt said table to permit the arbor on the table to roll off the table.

5. The combination of claim 4, and horizontal guide means extending longitudinally of the third cylinder and above said table, and means to slidably support the arbor-engaging means on the piston rod for the third cylinder on said guide means as the arbor is being withdrawn from the flask and onto said table.

6. An apparatus for removing core arbors from mold flasks and comprising a flask conveyor for conveying flasks longitudinally in end to end relation, a flask support disposed alongside said conveyor, flask-engaging means for moving a flask containing a core arbor within a casting, sidewise, onto said support from said conveyor, and arbor-engaging means for urging said arbor longitudinally outwardly of the casting and flask, said flask-engaging means including means for moving said flask from said support and replacing the flask onto said conveyor, said arbor-engaging means comprising punch-out means engaging one end of the arbor for pushing the latter longitudinally until the opposite end of the arbor projects outwardly of the flask, and draw means engaging said outwardly projecting opposite end of the arbor for pulling the latter longitudinally outwardly until the entire arbor is removed from the flask, an arbor support disposed in end to end relation relative to said flask support and located to receive and support the arbor removed from the flask by said flask-engaging means, and means movably mounting the arbor support for swinging movement about a longitudinal horizontal axis from a first horizontal position for receiving the arbor, to a second position away from horizontal for discharging the arbor from said support.

References Cited in the file of this patent

UNITED STATES PATENTS

| | | |
|---|---|---|
| 951,576 | Price | Mar. 8, 1910 |
| 1,025,123 | Clow | May 7, 1912 |
| 1,035,374 | McWane | Aug. 13, 1912 |
| 1,158,921 | Hewitt | Nov. 2, 1915 |
| 1,239,808 | Morris | Sept. 11, 1917 |
| 1,304,142 | Anthony | May 20, 1919 |
| 1,570,658 | Wickland et al. | Jan. 26, 1926 |
| 1,589,652 | McWane | June 22, 1926 |
| 1,960,366 | Barr et al. | May 29, 1934 |
| 2,134,117 | Floyd et al. | Oct. 25, 1938 |
| 2,244,430 | Parsons et al. | June 3, 1941 |
| 2,431,174 | Henry | Nov. 18, 1947 |
| 2,494,071 | Veale | Jan. 10, 1950 |
| 2,519,739 | Butner | Aug. 22, 1950 |
| 2,525,572 | Woody et al. | Oct. 10, 1950 |
| 2,581,418 | Kohl | Jan. 8, 1952 |

FOREIGN PATENTS

| | | |
|---|---|---|
| 114,346 | Switzerland | June 26, 1945 |